US008005989B2

(12) United States Patent
Corl, Jr. et al.

(10) Patent No.: US 8,005,989 B2
(45) Date of Patent: *Aug. 23, 2011

(54) CACHING LOOKUPS BASED UPON TCP TRAFFIC FLOW CHARACTERISTICS

(75) Inventors: Everett A. Corl, Jr., Raleigh, NC (US); Gordon T. Davis, Chapel Hill, NC (US); Clark D. Jeffries, Durham, NC (US); Natarajan Vaidhyanathan, Greensboro, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/188,333

(22) Filed: Aug. 8, 2008

(65) Prior Publication Data
US 2008/0298244 A1    Dec. 4, 2008

Related U.S. Application Data

(63) Continuation of application No. 10/662,007, filed on Sep. 11, 2003, now Pat. No. 7,464,181.

(51) Int. Cl.
*G06F 15/173* (2006.01)
(52) U.S. Cl. ........................ 709/240; 709/223
(58) Field of Classification Search .................. None
See application file for complete search history.

(56) References Cited

U.S. PATENT DOCUMENTS

| 5,339,435 A | 8/1994 | Lubkin et al. |
| 5,465,342 A | 11/1995 | Walsh |
| 5,537,609 A | 7/1996 | Whittaker et al. |
| 5,640,531 A | 6/1997 | Whittaker et al. |
| 5,842,040 A | 11/1998 | Hughes et al. |
| 5,920,705 A * | 7/1999 | Lyon et al. .................. 709/240 |
| 6,041,053 A | 3/2000 | Douceur et al. |
| 6,085,225 A * | 7/2000 | Nakajima et al. ........... 709/203 |
| 6,118,760 A * | 9/2000 | Zaumen et al. .............. 370/229 |
| 6,119,202 A | 9/2000 | Borkenhagen et al. |

(Continued)

FOREIGN PATENT DOCUMENTS

| JP | 59085160 A1 | 5/1984 |
| JP | 09-181776 A1 | 11/1997 |
| JP | 10322392 A1 | 12/1998 |
| JP | 2002305541 A1 | 10/2002 |
| JP | 2003198611 A1 | 7/2003 |

OTHER PUBLICATIONS

European Patent Office Communication pursuant to Article 94(3) EPC issued Mar. 6, 2009 re Application No. 04 766 726.6-1525, filed Jun. 3, 2009, 4 pages.

(Continued)

*Primary Examiner* — Jeffrey R Swearingen
(74) *Attorney, Agent, or Firm* — Patrick J. Daugherty; Driggs, Hogg, Daugherty & Del Zoppo Co., LPA

(57) ABSTRACT

The classification system of a network device includes a cache in which a mapping between predefined characteristics of TCP/IP packets and associated actions are stored in response to the first "Frequent Flyer" packet in of a session. Selected characteristics from subsequent received packets of that session are correlated with the predefined characteristics and the stored actions are applied to the received packets if the selected characteristics and the predefined characteristics match, thus reducing the processing required for subsequent packets. The packets selected for caching may be data packets. For mismatched characteristics, the full packet search of the classification system is used to determine the action to apply to the received packet.

24 Claims, 7 Drawing Sheets

U.S. PATENT DOCUMENTS

| | | | |
|---|---|---|---|
| 6,173,364 B1 | 1/2001 | Zenchelsky et al. | |
| 6,185,221 B1 * | 2/2001 | Aybay | 370/412 |
| 6,226,267 B1 | 5/2001 | Spinney et al. | |
| 6,247,061 B1 * | 6/2001 | Douceur et al. | 709/240 |
| 6,256,708 B1 | 7/2001 | Watanabe | |
| 6,308,211 B1 * | 10/2001 | Rosborough et al. | 709/224 |
| 6,356,951 B1 * | 3/2002 | Gentry, Jr. | 709/250 |
| 6,381,649 B1 * | 4/2002 | Carlson | 709/235 |
| 6,404,752 B1 | 6/2002 | Allen et al. | |
| 6,405,257 B1 | 6/2002 | Gersht et al. | |
| 6,412,000 B1 * | 6/2002 | Riddle et al. | 709/224 |
| 6,434,624 B1 * | 8/2002 | Gai et al. | 709/232 |
| 6,457,051 B1 * | 9/2002 | Riddle et al. | 709/224 |
| 6,460,120 B1 * | 10/2002 | Bass et al. | 711/148 |
| 6,493,754 B1 * | 12/2002 | Rosborough et al. | 709/224 |
| 6,496,935 B1 * | 12/2002 | Fink et al. | 726/13 |
| 6,526,066 B1 * | 2/2003 | Weaver | 370/465 |
| 6,754,662 B1 | 6/2004 | Li | |
| 7,007,095 B2 | 2/2006 | Chen et al. | |
| 7,100,020 B1 | 8/2006 | Brightman et al. | |
| 2003/0163554 A1 | 8/2003 | Sendrowicz | |

OTHER PUBLICATIONS

McLachian, Northcutt, Novak, Filters to Detect, Filters to Protect, Sep. 19, 2000, NewRiders/infrormit .com <http://www.informit.com/articles/printfriendly.asp?p=130757&rl=1>.

Sobrinho, Joao, "Network Routing with Path Vector Protocols: Theory and Applications." Proceedings of the 2003 conference on Applications, technologies, architectures, and protocols for computing communications. ACM Press. Aug. 2003, 49-60.

Low, Steven et al., "Optimization Flow Control—I:Basic Algorithm and Convergence" IEEE/ACM Transactions on Networking, vol. 7, No. 6, Dec. 1999, IEEE, 861-74.

Martin A. Brown, Guide to IP Layer Network Administration with Linux, Apr. 26, 2003, Chapter 4.7, http://linuxip.net/html/routing-cache.html.

Information Sciences Institute, Transmission Control Protocol Specification. Sep. 1981, pp. 15-19.

International Search Report and Written Opinion PCT/EP2004/052068.

* cited by examiner

600

IP Header Format

| 0 | 4 | 8 | 16 | 19 | 31 |
|---|---|---|---|---|---|
| Version | IHL | Type of Service | Total Length | | |
| Identification | | | Flags | Fragment Offset | |
| Time To Live | | Protocol | Header Checksum | | |
| Source IP Address | | | | | |
| Destination IP Address | | | | | |
| Options | | | | Padding | |

TCP Header Format

CACHING LOOKUPS BASED UPON TCP TRAFFIC FLOW CHARACTERISTICS

CROSS-REFERENCE TO RELATED APPLICATION

This application is a continuation of U.S. patent application Ser. No. 10/662,007, filed Sep. 11, 2003, now U.S. Pat. No. 7,464,181 B2, issued Dec. 9, 2008.

BACKGROUND OF THE INVENTION

1. Field of the Invention

The present invention relates to communications networks in general and, in particular, to enhancing the data management capabilities of devices connected to said network.

2. Prior Art

The description which follows presupposes knowledge of network data communications and switches, network processors, adapters, routers, etc. as used in such communications networks. In particular, the description presupposes familiarity with the OSI model of network architecture which divides network operation into layers. A typical architecture based upon the OSI model of network architecture which divides network operation into layers. A typical architecture based upon the OSI model extends from Layer 1 (also sometimes identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

A general model for a communications network may include one or more private networks coupled via a firewall or similar structure to a public network such as the World Wide Web (WWW) better known as the Internet. Communications between devices connected to the network, hereafter called network devices, may occur solely within the private network or through the firewall via the Internet to remote private networks.

In order to exchange information between network devices and to manage the network some type of protocol is required. The protocol could be characterized as a set of rules that govern access to the network and in some cases are used to keep the network in operable condition. Even though there are some standard protocols, such as ethernet, token ring, etc. that can be used on private networks for the most part private network may use any protocol management wishes to use. The only possible restriction is that network devices, on the private network, must be cognizant of the protocol or else the network devices will not be able to operate or communicate satisfactorily.

Because of the lack of uniformity on private protocols further discussion is limited to the public protocol which is used on the internet. The public protocol is referred to as TCP (Transmission Control Protocol)/IP (Internet Protocol). This is a well known protocol which is used to communicate over the internet.

One measure of performance for network devices, such as network processors, running IP routing applications is based upon the number of packets processed or classified within a set time interval such as one second. This in turn can be influenced by the type of classification that is required. For the purpose of routing packets in a network classification may be grouped as Layer 2 (L2), Layer 3 (L3), Layer 4 (L4) and above. The computational requirements for each of the layers increases from L2 to L4 and above.

For example, L2 classification may be as simple as finding a Media Access Control (MAC) table match. This procedure would require comparing a MAC Source Address (SA) or MAC Destination Address (DA) packet with addresses in a table. A more general approach is to use a Full Match Algorithm, such as the one disclosed in application Ser. No. 09/543,531 for L2 classification tasks.

L3 classifications can be used for routing and other L3 functions. L3 classification, if used for routing purposes, requires finding the longest prefix match between information in a packet and information in a database. A Longest Prefix Match Algorithm is used for L3 classification. The Longest Prefix Match Algorithm is more complex than the Full Match Algorithm and, therefore, requires more computational time.

L4 classification includes complex functions such as enforcement of filter rules with possible complex interceding ranges etc. This type of classification usually requires complex algorithm which use relatively long time interval to process a packet. The time interval to process a packet even increases for lookups or classification above L4. Processing above L4 classification is referred to as deep packet processing.

In view of the above, the throughput (number of packets processed per second) of a network device, such as a network processor, depends on the type of lookups or classifications carried out by the device. As a consequence, the computational resources of network processors are stressed when L3 and higher lookups are required. In addition, network processors are often required to carry out lookups with millions of packets per second which further stress the computational resources. With the resources of network processors being stressed, the likelihood of them being able to meet throughput requirements and at the same time process L3 and above lookups appears relatively low.

SUMMARY OF THE INVENTION

The present invention provides an accelerator which improves look-up capabilities of network devices and by so doing the network devices are able to classify packets more efficiently than has heretofore been possible.

The accelerator includes a memory called a cache in which characteristics of TCP packets called four-tuple (described herein) are stored. The four-tuple include Internet Protocol (IP) SA, the IP DA, the Transmission Control Protocol (TCP) source port (SP) and the destination port (DP). Actions associated with each of the four-tuple are also stored. Match logic correlates the four-tuple in a received packet with the four-tuple in the cache. If a match occurs the actions associated with the four-tuple in the cache is applied to the received packet. If a match does not occur the regular process used to classify a packet of that type is followed. Specific methods and apparatus are provided to populate and dynamically age the Flow Cache. The cache and related hardware and/or software are termed "Flow Cache".

By using the Flow Cache a network processor can classify packets at a faster rate than was heretofore possible.

Exemplary methods for managing traffic in a communications network include providing, in a network device, a cache containing predefined characteristics associated with packets and actions paired with some of the predefined characteristics. In receiving a packet in the network device, methods include selecting from received packet characteristics similar to the predefined characteristics, correlating characteristics selected from the received packet with the predefined characteristics, and using results from the correlation to process the received packet.

Other methods include providing in a memory a mapping of predefined characteristics associated with packets and actions to be performed, receiving packets to be classified, correlating selected characteristics of received packets with the predefined characteristics, and performing stored actions on received packets if selected characteristics match predefined characteristics.

Still other methods of classifying packets in a communications network according to the present invention include the acts of receiving packets in a network device, determining data packets present in received packets, and providing a cache in which predefined characteristics of packets and actions associated with selected ones of the predefined characteristics are stored. For each data packet so determined, the methods correlate selected characteristics of the data packet with the predefined characteristics in the cache, and impose on each of those data packets selected characteristics matching one of the predefined characteristics an action associated with one of the predefined characteristics.

Embodiments also include systems that include a processor and a cache operatively coupled to the processor, wherein the cache stores a napping between predefined characteristics of packets and actions. A processor executes a program that causes the processor to correlate characteristics of selected packets with the predefined characteristics and enforce on selected packets actions associated with the predefined characteristics, if characteristics from selected packets match the predefined characteristics. Some systems may also include a memory that stores a mapping between predefined characteristics of packets and actions to be performed for a subset of the set of all characteristic values, and a controller that correlates characteristics in a received packet with the predefined characteristics and performs actions on a received packet if characteristics match the predefined characteristics.

System embodiments may include a network processor and a memory operatively coupled thereto, the memory storing therein a data structure for a full packet search, wherein the network processor executes a program that causes the network processor to access the data structure and imposing on a packet an action stored in said data structure if a mismatch occurs between the predefined characteristics and the characteristics from the selected packets. Exemplary programs include a full match algorithm, a Longest Prefix Match algorithm and a Software Managed Tree algorithm. The coupled memory may be internal or external to the network processor. Data structures may include a Direct Table and Patricia Tree.

Embodiments also provide for a program product including a medium on which a computer program is recorded, wherein the program includes instructions that correlate characteristics of a received packet with characteristics in a table, the table containing a subset of all possible characteristic values; and also instructions to enforce an action stored in the table on the received packet if the characteristics of the received packet and the characteristics in the table match. Some program products further include instructions to generate the table containing the characteristics and associated actions, and products may include instructions to maintain the table, and optionally to delete aged entries and insert new entries.

Other object, features and advantages of the present invention will be apparent from the accompanying drawings and from the detailed description which follows below.

DETAILED DESCRIPTION OF THE EMBODIMENT

The present invention uses flow caching to expedite classification of packets in a communications network and hence improve the number of packets the network device can process in a particular unit time. It works well with TCP traffic and as such will be described in that environment. However, this should not be a limitation upon the scope of the invention since it works well with any communication protocol in which traffic occurs in bursts. For example, it is believed that UDP traffic (protocol 17) between DNS servers occur in bursts and could also benefit from flow caching. As a general statement of the invention the general approach is to identify those flows which consistently have the most bundling and only go to the cache for them. Of equal importance is avoiding the cache for those packet types which do not bundle.

Flows or packets with most bundling comes in bursts that occur within relatively short period of time interval and are referred to in this document as "Frequent Flyers".

Figure 1:
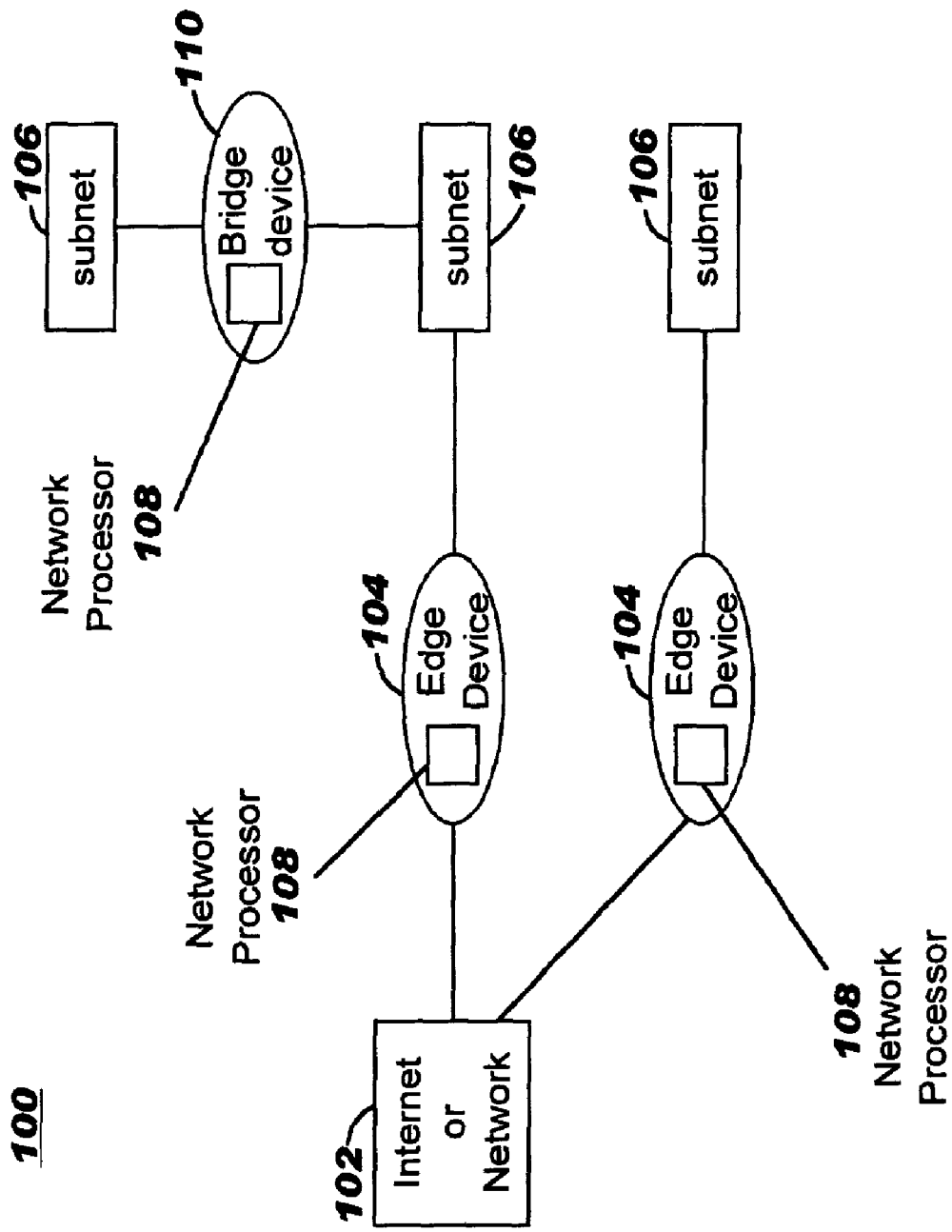
FIG. 1 shows a block diagram of a communications network with network devices practicing teachings of the invention.

FIG. 1 shows a highly simplified network 100 in which the teachings of the present invention are deployed. The network includes the plurality of edge devices 104 connected to the internet or other network 102. Each of the edge device 104 are connected to a sub network 106 which could be private networks interconnecting users in a building, campus, etc. Such sub networks are well known in the art and will not be described further. Sub-network 106 is connected by bridge device 110 to another sub network. The edge devices 104 could be a router switch or any other network device used for this type of packet handling. Each of the edge devices is provided with network processor 108. Depending on the type of device one or more network processors could be used. The bridge device 110 could also contain a network processor 108 which is used to perform routing function. The use of network devices such as 104 and 110 are well known in the art, therefore further description of these entities will not be given.

Figure 2:
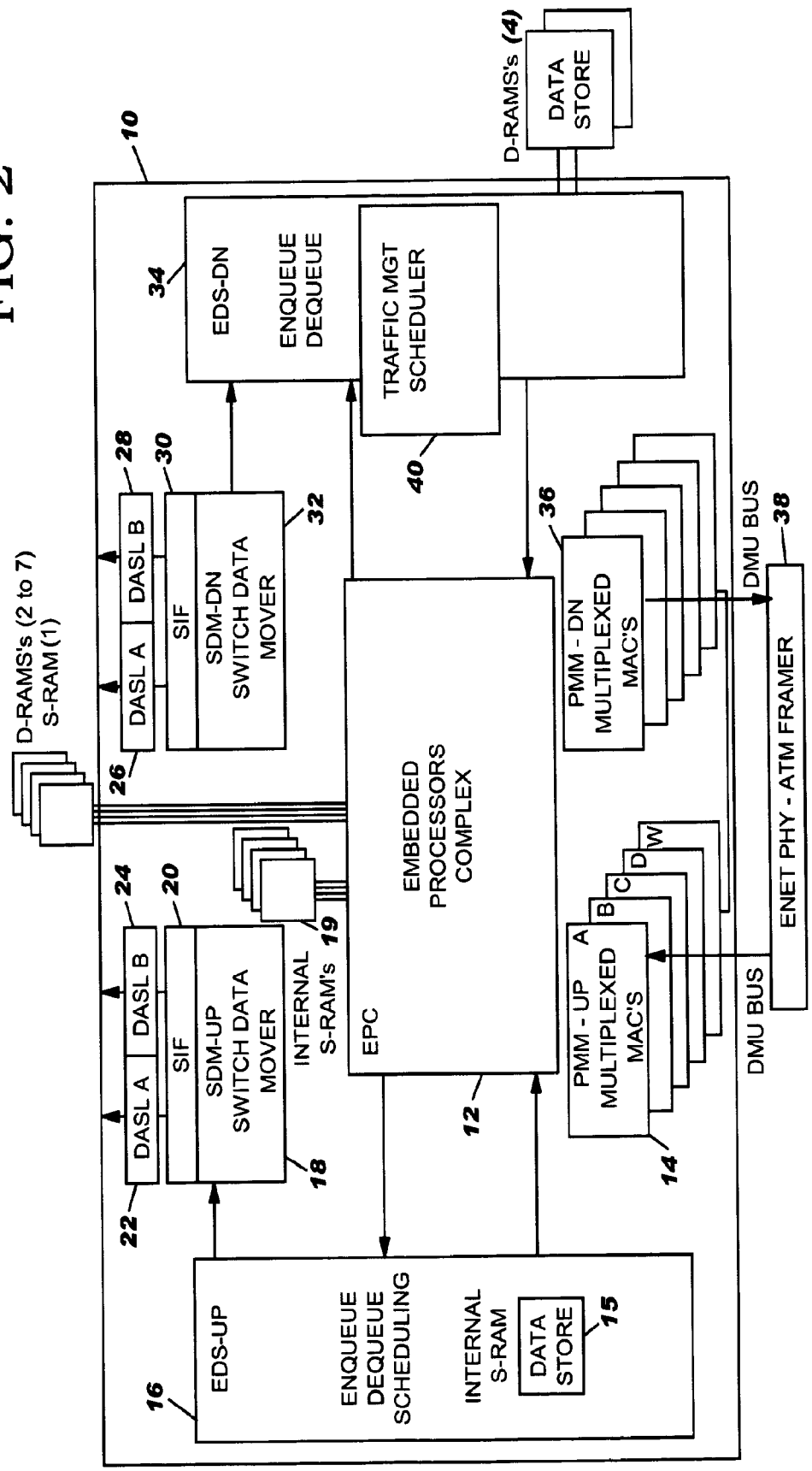
FIG. 2 shows a block diagram of a network processor.

FIG. 2 shows a block diagram of the Network Processor shown in FIG. 1. The Network Processor executes IP routing applications including those according to teachings of the present invention and classifies frames as they are received from the internet. Different classification tasks including Layer 2 (finding a MAC table match), Layer 3 (finding a longest prefix match for routing), Layer 4 (enforcement of filter rules with possible complicated intersecting ranges of protocol parameters) and higher layer lookup (up to the application layer, e.g. so called deep packet processing) are performed by the Network Processor. Some of the classifications such as Layer 4 classification require relatively long processing times because complex algorithms are involved. The present invention provides an apparatus and technique that significantly reduces the average time necessary to perform Layer 3, Layer 4 and higher layer classification. Even though any type of network processor can be used to perform the classification function in the preferred embodiment of the invention PowerNP developed and marketed by IBM is used. The PowerNP is a single chip device 10 that includes a plurality of functional units integrated on the substrate. The functional units are arranged into an upside configuration and a downside configuration, with the upside configuration (sometimes also referred to as an "Ingress") referring to those components relating to data inbound to the chip from a data transport network (up to or into the chip) and "downside" (sometimes referred to as an "Egress") referring to those components whose function is to transmit data from the chip toward the data transmission network in an outbound fashion (away from the chip or down and into the network). Data flow follows the respective arrangements of the upside and downside configuration. As a consequence there is an upside data flow and a downside data flow in the system of FIG. 2. The upside or Ingress configuration elements include an enqueue dequeue scheduling UP (EDS-UP) logic 16, multiple multiplexed MACs-UP (PMM-UP) 14, Switch data mover up (SDM-DN) 18, system interface SIF (20), data align serial link A (DASL A) 22 and data align serial link B (DASL B) 24. DASL A 22 and DASL B 24 connect the network processor to a switch in systems with many network connections requiring multiple network processors.

Still referring to FIG. 2 the components depicted on the down side (or Egress) of the system includes data links (DASL-A) 26 and DASL-B 28, system interface SIF 30, switch data mover (SDM-DM) 32, enqueue-dequeue-scheduler EDS-DN 34 and multiple multiplex MACs for the Egress PMM-DN 36. The network processor chip 10 also includes a plurality of internal static access memory components (S-RAM's), a traffic management scheduler (TRAFFIC MGT SCHEDULER) also known as Egress scheduler 40 and an embedded processor complex 12. The embedded processor complex contains a plurality of processors and coprocessors which are used to perform the classification function. An interface device 38 is coupled by the respective Data Movement Unit (DMU) buses to PMM 14, and 36. The interface device 38 could be any suitable hardware apparatus for connecting to a network (not shown) such as ethernet physical device or asynchronous transfer mode (ATM) device, etc. A more detailed description of the PowerNP is given in U.S. Pat. No. 6,404,752 which is incorporated in its entirety within this document.

As stated previously the protocol which is used on the internet is the TCP/IP protocol. The present invention is described with respect to data packets using this protocol. The TCP/IP protocol has certain packets referred to in the present invention as "Frequent Flyers" which consistently occur in bursts. Each processor is preprogrammed with rules including actions to be taken relative to packets received, in the Network Processor, and matching a particular rule. According to the teaching of the present invention, Frequent Flyers and their associated actions are placed in the cache and subsequent members of the burst can be processed based upon information stored in the cache. As a consequence the throughput of the system using the present invention is enhanced.

It should be noted that if a match is not found for a packet in the cache the standard classification system and method provided for in the Network Processor is followed. The standard classification system and method requires more time than the cache to process packets. As a consequence the cache reduces the latency associated with standard classification systems.

Figures 4, 6:
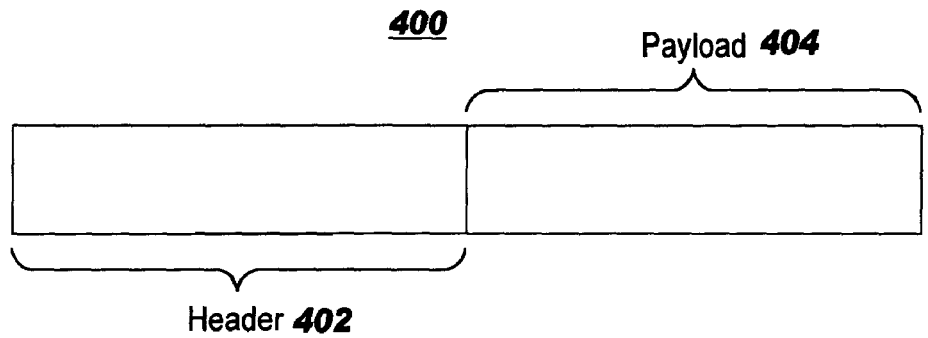
FIG. 4 shows a graphical representation of the format for packets.
FIG. 6 shows a format for IP header.

FIG. 4 shows a graphical representation of TCP/IP packet or frame 400 which includes a header portion 402 and a payload 404. The TCP/IP format is well known in the prior art. Therefore, only the portion of the format which relates to the present invention will be discussed further. The portion of the format which is relevant to the present invention is the header 402. The header section 402 includes both a TCP portion and an IP portion.

FIG. 6 shows IP Header format 600 for the IP portion of the header. The IP header format is well known in the prior art. Therefore, only those portions of the header that are of interest to the present invention will be discussed. The portion of the IP header format which is relevant to the present invention is the subfield labeled Protocol, the subfield labeled IP Source Address and the subfield labeled IP Destination Address. As will be discussed subsequently the Source Address (SA) and Destination Address (DA) are two of the four parameters referred to as the four-tuple which will be used as entry into the Flow Cache controller described hereinafter. It should be noted that the Protocol subfield is also used to identify the type of packet that is being transmitted (i.e. TCP).

Figure 5:
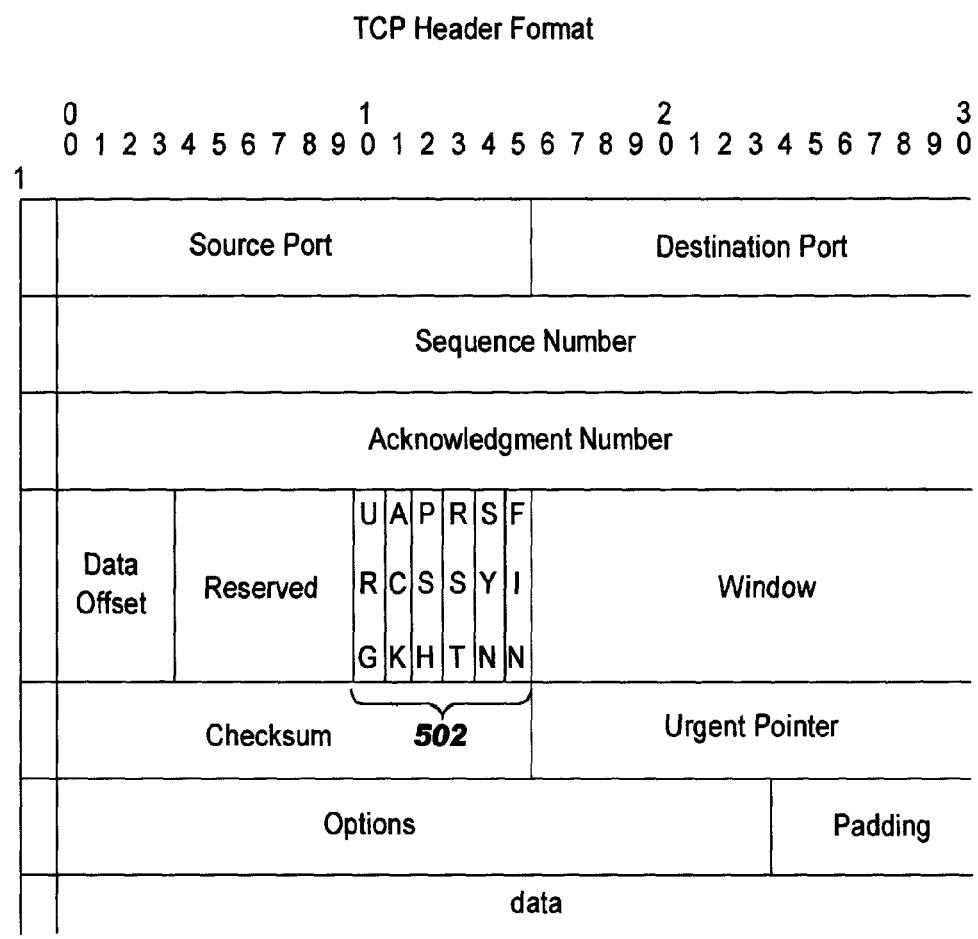
FIG. 5 shows a format for TCP header.

FIG. 5 shows TCP header format 500. The TCP header format is well known in the prior art; therefore, only those fields which are used in the present invention will be discussed. The fields which are used includes the Source Port (SP) and Destination Port (DP). As will be discussed hereinafter the SA, DA from the IP header format and SP, DP from the IP TCP header format are known as the four-tuple which will be used in the Flow Cache. Also of interest are the control keys identified by numeral 502. Each key is a one bit field that identifies the type of packet that is being transmitted. The bit is set by the source device originating the packet. For example if the bit in the key labelled SYN is set to a logical '1' the packet would be a synchronization packet. The packets identified by 502 are required to establish a session between network devices.

Figure 3:
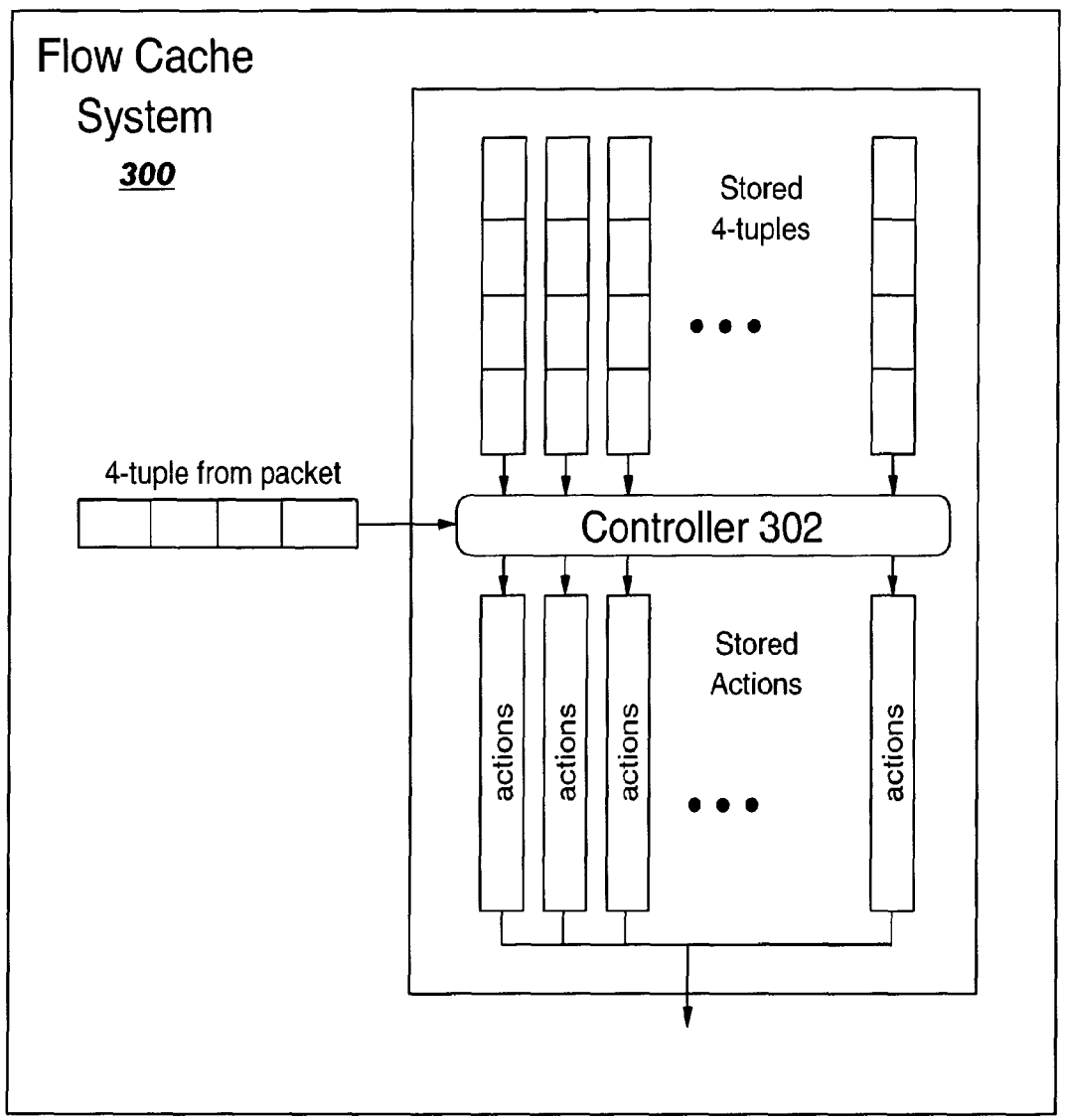
FIG. 3 shows a block diagram of a subsystem (Flow Cache and controller) according to the teachings of the present invention.

FIG. 3 shows a functional block diagram of the Flow Cache system 300 according to the teachings of the present invention. The Flow Cache system includes an associative memory of limited size which stores a mapping between characteristics of flows and action to be taken relative to the flows. In one embodiment of the present invention the characteristics are the four components of the four-tuple, namely, the IP Source Address (SA), the IP Destination Address (DA), the TCP Destination Port (DP) and Source Port (SP). A controller 302 correlates the characteristic (four-tuple) from a received packet with the content of the associated memory. If a match is found, then the actions stored relative to the four-tuple are applied to or imposed on the frame or packet. Extracting information (i.e. action to be taken relative to a packet) from the Flow Cache system 300 is much faster than using the traditional algorithm such as longest prefix match or software managed tree algorithm to determine what action to be taken relative to a packet. It should be noted that even though the description covers Layer 3 and Layer 4 processing, it can also be extended to include Layer 2 or other processing by concatenating N fields from packet headers (one or more layers in the OSI model) to create an "n-tuple". For example, Layer 2 actions could be added to a Layer 2 version of the invention using Layer 2 header fields.

For this invention to be effective the size of the cache has to be controlled. If the size of the cache is too large it could actually degrade performance of the system. The cache should only be large enough to maintain session information for the duration of a burst of the Frequent Flyers. Examination of real Internet traffic shows that this interval is approximately 1 ms. This interval along with the Frequent Flyer packet rate handled by the network processor can be used to compute the required size of the cache.

Ideally, the cache size should be able to be contained within internal fast SRAM and should be small enough to be searched within the time available to process the packet. Note that larger caches may require more time to search.

Figure 7:
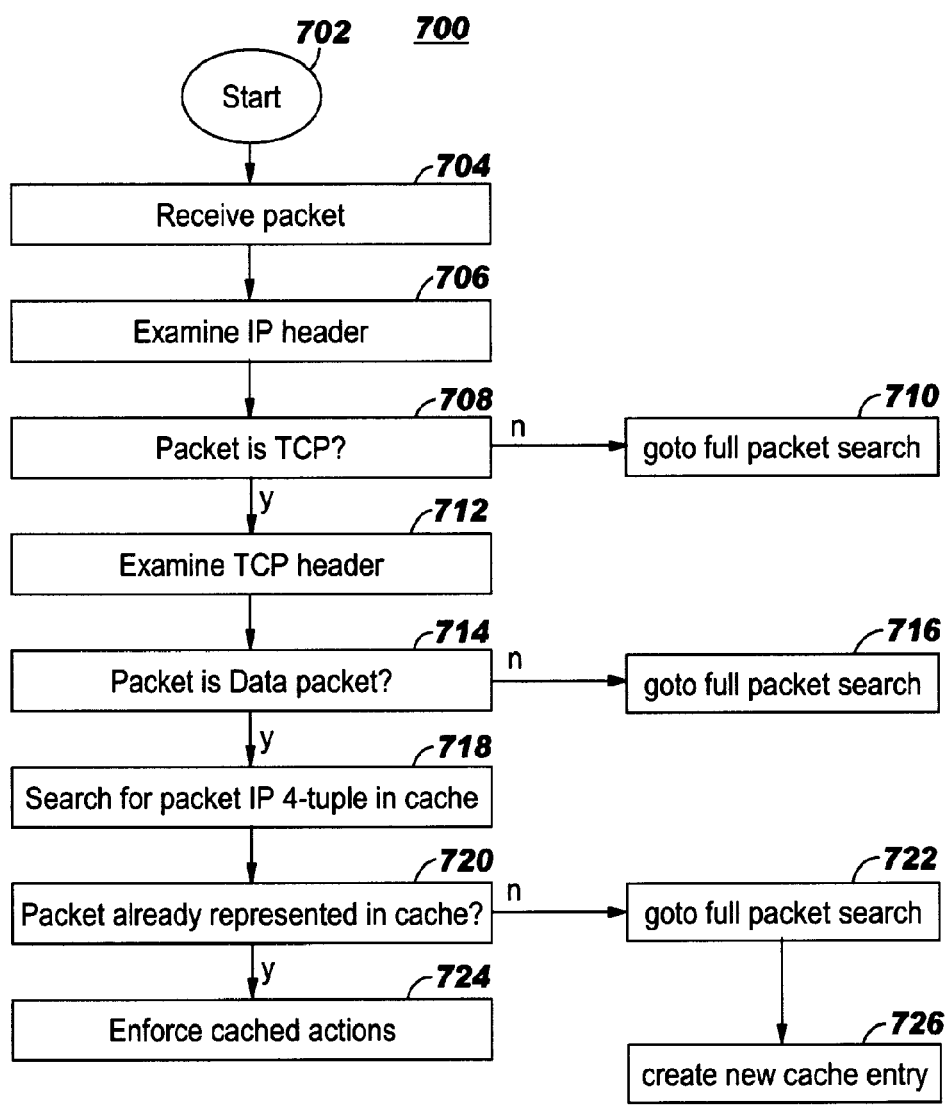
FIG. 7 shows a flowchart of a program executed on a computer according to teachings of the present invention.

FIG. 7 shows a flowchart of the packet processing algorithm 700 according to the teachings of the present invention. The algorithm is executed in the Network Processor. Preferably, only data frames would be eligible for processing, using the teachings of the present invention, since they typically are transmitted in bursts as a result of fragmenting large messages into multiple smaller packets based on the Maximum-sized Transmission Unit (MTU) supported by the network path. Other packets, such as SYN, FIN or RST, in the TCP/IP protocol suite would not be cached since consecutive packets of these types are typically separated in time by the round trip delay of the required network path. Data packets could be identified as such by examining the flag bits 502 (FIG. 5) in the TCP header and possibly the length field in the IP header and the data offset field in the TCP header. The flag bits are also called control bits, both of which are used interchangeably in this document. Those packets which have any of the SYN FIN or RST flags set are not data packets. If none of these bit values are set (i.e. Equal to 1) in the control flag field of the TCP header, then the length field in the IP header must be examined. Next the data offset field in the TCP header (multiplied by 4) must be subtracted from this value. If the result of the subtraction is greater than zero there is data in the packet. Alternatively, some other value greater than 0 could be chosen as a threshold. If the result indicates that there is data in the TCP packet, then the packet is considered a data packet and is thus a Frequent Flyer. Alternatively, just the length field in the Ethernet header could be compared as a first step to a fixed value such as 1400 Bytes. If greater than the comparOSIn value, then the packet would be considered a data packet.

Referring again to FIG. 7 the algorithm begins in start block 702 and descends into 704 where a packet is received. After a packet is received some initial checks are performed in block 706 to see if the packet is a Frequent Flyer and thus cacheable. In block 708 the packet is checked to see if it is a TCP packet by examining the IP and TCP headers. If not, the normal forwarding path for a full packet search is taken (block 710). In the normal forwarding path the packet is forwarded to the full packet search mechanism of the Network Processor. This mechanism could be a full match search algorithm, a longest match prefix algorithm or a software managed tree algorithm. Each of these search algorithms is discussed in patent application Ser. No. 09/543,531 (Full Match), patent application Ser. No. 09/544,992 (Longest Prefix Match) and patent application Ser. No. 09/545,100 (Software Management Tree). The named applications are assigned to the assignee of the present invention and they are incorporated in their entirety herein. With reference to block 708 if the packet is a TCP/IP packet it is checked (block 712) to see if the packet is a data packet (block 714) according to the Frequent Flyer criteria given above. If not, again the normal forwarding path is followed block 716. If it is a data packet (block 714) then a cache lookup is performed using the four-tuple from the packet block 718. If a match is found (block 720) in the cache then the stored actions in the cache are enforced (block 724). The lookups involved in the normal forwarding paths are avoided. If no match was found block 720 then the normal forwarding path 722 to full packet search is exercised. In addition, a new cache entry (block 726) is added to the cache using the four-tuple of the packet and the action performed on that packet.

It is obvious from the description that the cache works in conjunction with the structure and full packet search algorithms identified above to provide a more efficient packet classification system.

Figure 8:
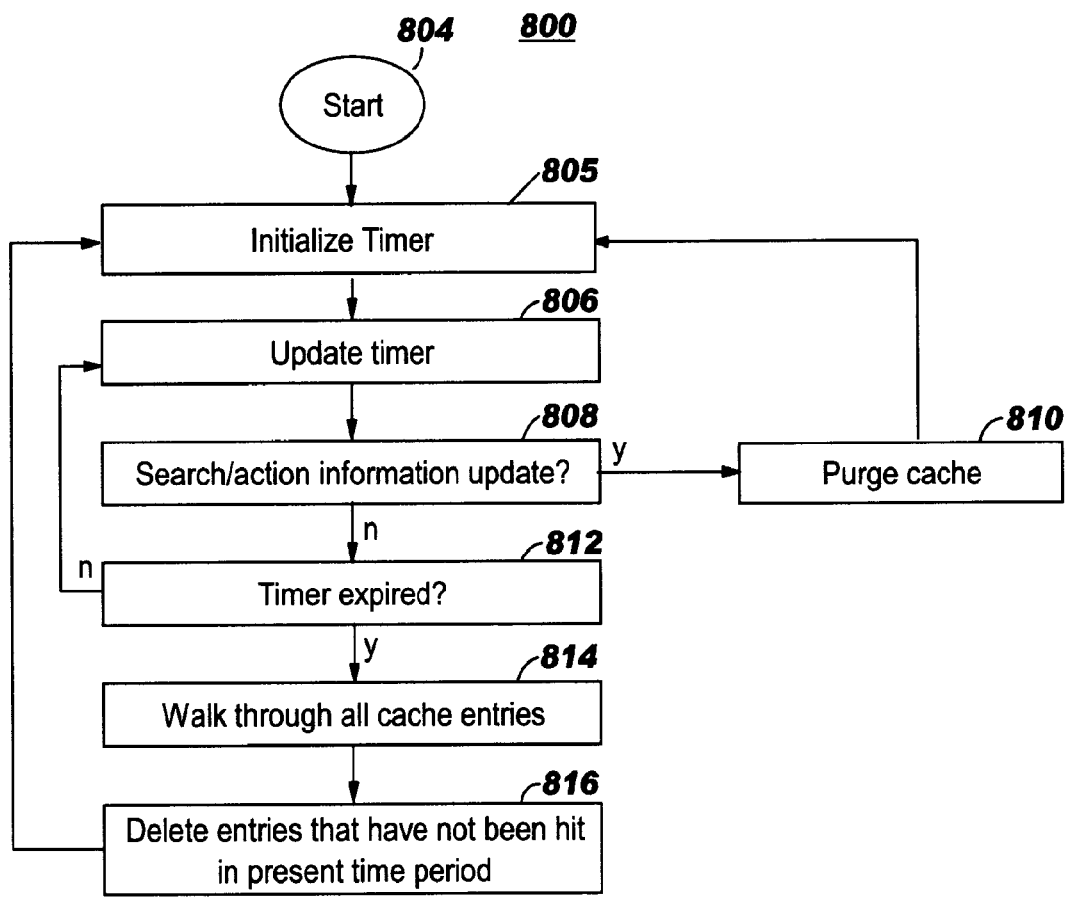
FIG. 8 shows a flowchart for purging the Flow Cache according to teachings of the present invention.

The contents of the cache has to be changed periodically in order for the system to work satisfactorily. This means older entries must be deleted to make space in the cache for newer entries. According to one embodiment, FIG. 8 a flowchart 800 of an aging algorithm. The aging algorithm is executed on the Network Processor and periodically delete old entries from the associated memory. The program begins in block 804 and descends into block 805. Block 805 initializes an expiration timer which controls the frequency at which the Flow Cache is aged. This timer would correspond to the expected burst interval of the Frequent Flyers. In block 806, the process waits for a check time interval (smaller than the burst timer) and then decrements the expiration timer value by that check time interval. At this point a check is made for a change in the Layer 3 or Layer 4 database. If a change has been made during the check time interval, then the cache may be invalid and should be purged. In such a case, the cache is purged (block 810). Processing then continues with block 805, starting a new expiration timer.

In the case that the database has not changed (block 808), processing continues with block 812. A check is made for the expiration timer expiring (reaching a value of zero). If the timer has expired, every entry of the cache is checked (block 814). If the timer has not expired, processing continues with block 806. Each entry which has not been used during the prior expiration interval is removed from the cache (block 816). Processing then continues with block 805, starting a new expiration timer.

In an alternate embodiment, instead of using the aging program 800, algorithm 700 can be modified slightly to perform the aging function. Within block 726, if no space is available for a new cache entry to be added, the least recently used cache entry can be removed and the new entry can be added in its place.

By using the Flow Cache to classify packets in a communications network instead of using traditional algorithm and data structure the time required to classify packets is such shorter and as a result system throughput is enhanced.

In yet another embodiment, the present invention relates to the classification of packets in a communications network. This is achieved by (a) receiving packets in a network device; (b) determining data packets present in received packets; and (c) providing a cache in which predefined characteristics of packets and actions associated with selected ones of the predefined characteristics are stored. For each data packet so determined, selected characteristics of the data packet are correlated with the predefined characteristics in the cache. For each data packet with selected characteristics matching one of the predefined characteristics, imposing on the data packet the action associated with the predefined characteristic. If the packets include TCP/IP packets, the determining act further includes the following acts. Examine control bits in the TCP header. If selected ones of said control bits include SYN, FIN and RST, they are set to a first state. The length field in the IP header is examined to determine its value. The value in the data offset field in the TCP header is multiplied by 4. The result of the multiplication is then subtracted from the value in the length field.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method for managing traffic in a communications network, the method comprising:
   examining an Internet Protocol (IP) header and a Transmission Control Protocol (TCP) header of a received packet to determine whether the received packet is a TCP/IP packet;
   determining whether the received packet is a data packet if determined that the received packet is a TCP/IP packet by
      examining control bits in the TCP header;
      examining a length field in the IP header to determine its value if selected ones of said examined control bits are set to a logical "0";
      multiplying a value in a data offset field in the TCP header by four;
      subtracting a result of the multiplication from the determined length field value; and
      determining that the received packet is a data packet if a result of the subtraction of the result of the multiplication is greater than zero;
   performing a lookup in a cache using a four-tuple of the received packet if determined that the received packet is a data packet, the received packet four-tuple comprising an IP Source Address (SA) from the IP header, an IP Destination Address (DA) from the IP header, a TCP Source Port (SP) from the TCP header and a TCP Destination Port (DP) from the TCP header;
   forwarding the received packet via a processor by enforcing actions stored in the cache if a match to the four-tuple is found in the cache by the lookup;
   forwarding the received packet via a processor full packet search path if determined that the received packet is not a TCP/IP packet, if determined that the received packet is not a data packet or if a match is not found in the cache by the lookup;
   adding an action performed on the received packet via the processor full packet search path to the cache using the four-tuple of the received packet if determined that the received packet is a TCP/IP packet and is a data packet and if a match is not found in the cache by the lookup; and
   updating contents of the cache at times that correspond to an expected burst interval of a bundling of data packets.

2. The method of claim 1, wherein the adding the action performed on the received packet via the processor full packet search path to the cache comprises:
   if no space is available for a new cache entry to be added, removing a least-recently-used cache entry from the cache and adding the action performed on the received packet to the cache in place of the removed least-recently-used cache entry.

3. The method of claim 1, wherein the processor full packet search path is a full match search path, a longest match prefix search path or a software managed tree search path.

4. The method of claim 1, wherein cache is an internal static random access memory cache operatively coupled to the processor on a network processor chip, and the cache has a size large enough to maintain session information for a duration of the expected burst interval and small enough to be searched within a time available to process the received packet.

5. The method of claim 4, wherein the time that corresponds to the expected burst interval is one millisecond.

6. The method of claim 4, further comprising updating the contents of the cache at the times that correspond to the expected burst interval of the bundling of packets by:
   initializing a decrementing expiration timer to the expected burst interval;
   waiting for a check time interval that is smaller than the expected burst interval;
   decrementing a value of the initialized expiration timer value by the check time interval and checking at an end of the check time interval for a change in a Layer 3 database or a Layer 4 database;
   if a change has been made during the check time interval in the Layer 3 database or in the Layer 4 database, purging the cache and reinitializing the expiration timer; and
   if the expiration timer decrements to zero, checking every entry of the cache, removing each checked entry in the cache which has not been used during a prior expected burst interval from the cache and reinitializing the expiration timer.

7. The method of claim 6, wherein the determining whether the received packet is a data packet comprises:
   subtracting a fixed data size value from the determined length field value; and
   determining that the received packet is a data packet if a result of the subtraction of the fixed data size value is greater than zero.

8. The method of claim 1, wherein the selected ones of said control bits include an SYN flag, an FIN flag or an RST flag.

9. A system, comprising:
   a network processor chip comprising a processor operatively coupled to an internal static random access memory cache and to an interface in communication with a network, wherein the processor:
   examines an Internet Protocol (IP) header and a Transmission Control Protocol (TCP) header of a packet received from the network through the interface to determine whether the received packet is a TCP/IP packet;
   determines whether the received packet is a data packet if determined that the received packet is a TCP/IP packet by:
      examining control bits in the TCP header;
      examining a length field in the IP header to determine its value if selected ones of said examined control bits are set to a logical "0";
      multiplying a value in a data offset field in the TCP header by four;
      subtracting a result of the multiplication from the determined length field value; and
      determining that the received packet is a data packet if a result of the subtraction of the result of the multiplication is greater than zero;
   performs a lookup in the cache using a four-tuple of the received packet if determined that the received packet is a data packet, the received packet four-tuple comprising an IP Source Address (SA) from the IP header, an IP Destination Address (DA) from the IP header, a TCP Source Port (SP) from the TCP header and a TCP Destination Port (DP) from the TCP header;

if a match to the four-tuple is found in the cache by the lookup, forwards the received packet by enforcing actions stored in the cache correlated by a cache controller to the four-tuples;

forwards the received packet via a full packet search path if determined that the received packet is not a TCP/IP packet, if determined that the received packet is not a data packet or if a match is not found in the cache by the lookup;

adds an action performed on the received packet via the full packet search path to the cache using the four-tuple of the received packet if determined that the received packet is a TCP/IP packet and is a data packet and if a match is not found in the cache by the lookup; and updates contents of the cache at times that correspond to an expected burst interval of a bundling of packets.

10. The system of claim 9, wherein the processor adds the action performed on the received packet via the frill packet search path by removing a least-recently-used cache entry from the cache and adding the action performed on the received packet to the cache in place of the removed least-recently-used cache entry, if no space is available for a new cache entry to be added.

11. The system of claim 9, wherein the processor full packet search path comprises a full match search path, a longest match prefix search path or a software managed tree search path.

12. The system of claim 9, wherein the cache has a size large enough to maintain session information for a duration of the expected burst interval and small enough to be searched within a time available to process the received packet.

13. The system of claim 12, wherein the time that corresponds to the expected burst interval is one millisecond.

14. The system of claim 12, wherein the processor updates the contents of the cache at the times that correspond to an expected burst interval of the bundling of packets by:
initializing a decrementing expiration timer to the expected burst interval;
waiting for a check time interval that is smaller than the expected burst interval;
decrementing a value of the initialized expiration timer value by the check time interval and checking at an end of the check time interval for a change in a Layer 3 database or a Layer 4 database;
if a change has been made during the check time interval in the Layer 3 database or in the Layer 4 database, purging the cache and reinitializing the expiration timer; and
if the expiration timer decrements to zero, checking every entry of the cache, removing each checked entry in the cache which has not been used during a prior expected burst interval from the cache and reinitializing the expiration timer.

15. The system of claim 14, wherein the processor determines whether the received packet is a data packet by:
subtracting a fixed data size value from the determined length field value; and
determining that the received packet is a data packet if a result of the subtraction of the fixed data size value is greater than zero.

16. The system of claim 9, wherein the selected ones of said control bits include an SYN flag, and FIN flag or an RST flag.

17. A computer program product for managing traffic in a communications network, the computer program product comprising:
a computer readable storage device;
first program instructions to examine an Internet Protocol (IP) header and a Transmission Control Protocol (TCP) header of a packet, received from a network to determine whether the received packet is a TCP/IP packet, and determine whether the received packet is a data packet if determined that the received packet is a TCP/IP packet by:
examining control bits in the TCP header;
examining a length field in the IP header to determine its value if selected ones of said examined control bits are set to a logical "0":
multiplying a value in a data offset field in the TCP header by four;
subtracting a result of the multiplication from the determined length field value; and
determining that the received packet is a data packet if a result of the subtraction of the result, of the multiplication is greater than zero;
second program instructions to perform a lookup in a cache using a four-tuple of the received packet if determined that the received packet is a data packet, the received packet four-tuple comprising an IP Source Address (SA) from the IP header, an IP Destination Address (DA) from the IP header, a TCP Source Port (SP) from the TCP header and a TCP Destination Port (DP) from the TCP header;
third program instructions to forward the received packet by enforcing actions stored in the cache correlated to the four-tuples if a match to the four-tuple is found in the cache by the lookup; and to forward the received packet via a frill packet search path if determined that the received packet is not a TCP/IP packet, if determined that the received packet is not a data packet or if a match is not found in the cache by the lookup; and
fourth program instructions to add an action performed on the received packet via the full packet search path to the cache using the four-tuple of the received packet if determined that the received packet is a TCP/IP packet and is a data packet and if a match is not found in the cache by the lookup, and to update contents of the cache at times that correspond to an expected burst interval of a bundling of packets; and
wherein the first, second, third and fourth program instructions are stored on the computer readable storage device.

18. The computer program product of claim 17, wherein the fourth program instructions are to add the action performed on the received packet via the full packet search path by removing a least-recently-used cache entry from the cache and adding the action performed on the received packet to the cache in place of the removed least-recently-used cache entry, if no space is available for a new cache entry to be added.

19. The computer program product of claim 17, wherein the processor full packet search path comprises a full match search path, a longest match prefix search path or a software managed tree search path.

20. The computer program product of claim 17, wherein the cache is an internal static random access memory cache operatively coupled to the processor on a network processor chip, and the cache has a size large enough to maintain session information for a duration of the expected burst interval and small enough to be searched within a time available to process the received packet.

21. The computer program product of claim 20, wherein the time that corresponds to the expected burst interval is one millisecond.

22. The computer program product of claim 20, wherein the fourth program instructions are to update the contents of the cache at the times that correspond to an expected burst interval of the bundling of packets by:

initializing a decrementing expiration timer to the expected burst interval;

waiting for a check time interval that is smaller than the expected burst interval;

decrementing a value of the initialized expiration timer value by the check time interval and checking for a change in a Layer 3 database or a Layer 4 database at an end of the check time interval;

if a change has been made during the check time interval in the Layer 3 database or in the Layer 4 database, purging the cache and reinitializing the expiration timer, and if the expiration timer decrements to zero, checking every entry of the cache, removing each checked entry in the cache which has not been used during a prior expected burst interval from the cache and reinitializing the expiration timer.

23. The computer program product of claim 22, wherein the first program instructions are to determine whether the received packet is a data packet by:

subtracting a fixed data size value from the determined length field value; and determining that the received packet is a data packet if a result of the subtraction of the fixed data size value is greater than zero.

24. The computer program product of claim 17, wherein the selected ones of said control bits include an SYN flag, an FIN flag or an RST flag.

* * * * *